May 13, 1969  J. BARKER ET AL  3,443,484
SEAL BETWEEN PISTON ROD AND CYLINDER WALL
Filed June 26, 1967
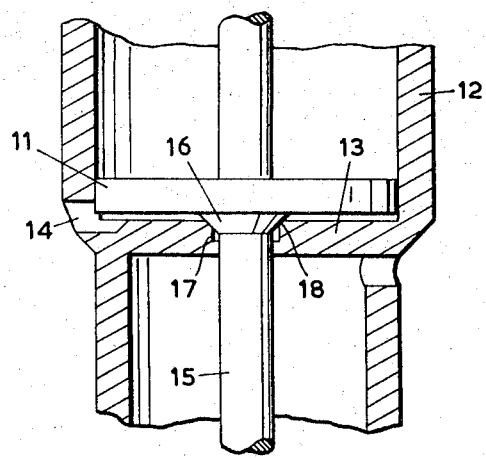
INVENTORS
John Barker,
Stanislaw Mieczyslaw Gonek
and Brian Neville Read
BY
    Misegades & Douglas
        ATTORNEYS United States Patent Office 3,443,484
Patented May 13, 1969

3,443,484
SEAL BETWEEN PISTON ROD AND
CYLINDER WALL
John Barker, Stanislaw Mieczyslaw Gonek, and Brian
Neville Read, Stafford, England, assignors to The English Electric Company Limited, London, England, a
British company
Filed June 26, 1967, Ser. No. 648,876
Claims priority, application Great Britain, June 24, 1966,
28,290/66
Int. Cl. F16j 15/56
U.S. Cl. 92—165          2 Claims

ABSTRACT OF THE DISCLOSURE

In a piston-and-cylinder device, in which the piston rod passes through an end wall of the cylinder, it is required under certain conditions to provide a gas-tight seal. Rubber rings and the like are adversely affected by heat, and by relative movement of the piston and cylinder.

An object of this invention is to provide a seal between the piston rod and the end wall of the cylinder, which is not affected by heat or movement, and which provides a gas-tight seal under those conditions in which such a seal is required.

The invention consists in providing an annular surface on the piston assembly and an annular surface on the end wall, which surfaces cooperate, when the piston is at one end of its stroke, to provide a gas-tight seal.

---

This invention relates to seals.

According to this invention, there is provided an assembly including a relatively-movable piston and cylinder, said piston including a piston rod passing through an end wall of said cylinder, wherein cooperating annular surfaces are provided on the piston and on the end wall, which surfaces cooperate when the piston is in its position nearest to the end wall, to form a substantially gas-tight seal.

One embodiment of the invention will now be described by way of example with reference to the accompanying drawing, which is a longitudinal section through a piston-and-cylinder device.

Referring to the drawing, the piston-and-cylinder device comprises a piston 11 operating in a cylinder having a cylindrical wall 12 and an end wall 13. Movement of the piston 11 upward in the drawing compresses air or other gas in the cylinder and delivers it through a non-return valve (not shown) to a point of use. An aperture 14 is provided in the cylindrical wall 12 to allow ingress of air below the piston 11 (as seen in the drawing).

The piston rod 15 passes through and is a sliding fit within the end wall 13, and in order to provide a seal between the piston rod 15 and the wall 13, the rod has a part 16 of frusto-conical form where it jions the piston 11, and the wall is provided with a recess 17, extending part way through it, the lip 18 of the recess being of frusto-conical form and having the same cone angle as the part 16.

When the piston 11 is at the initial end of its stroke, the frusto-conical part 16 of the piston rod is firmly in contact with the lip 18, providing an effective seal against the leakage of gas through the wall 13 along the surface of the piston rod 15. The rapid movement of the piston 11 upward (as seen in the drawing) to compress the air, and its restoration to its initial position, occupies a relatively very short time, during which a good seal is not essential.

The seal in accordance with the invention provides a metal-to-metal circular contact, and avoids the use of rubber rings and similar devices which are deleteriously affected by heat and movement.

The piston-and-cylinder device having a seal in accordance with the invention may also be used as a motor, i.e., a device in which air or other gas is fed to the device to cause relative movement of the piston and cylinder.

We claim:

1. In an assembly including a relatively movable piston and cylinder, said piston including a piston rod passing through the end wall of the cylinder, means defining an aperture in a cylinder wall for allowing ingress of gas into the cylinder between the piston and said end wall, and sealing means for providing a seal against the leakage of gas from said aperture along said piston rod and through said end wall, wherein the improvement comprises said sealing means consisting of:

(i) cooperating annular surfaces provided on the piston and said end wall, which surfaces cooperate together in a manner whereby they are firmly in contact with each other so as to form a gas-tight seal when the piston is in its position nearest to said end wall, the annular surface on the piston extending between the piston rod and the adjacent face of the piston, and (ii) said piston rod being a sliding fit within said end wall so as to provide an adequate seal during a relatively very short time in which said piston is not in its position nearest to said end wall and said cooperating surfaces are not firmly in contact with each other.

2. In an assembly according to claim 1, wherein the improvement further comprises said annular surface on the piston being of frusto-conical form, and said annular surface on the end wall being also of frusto-conical form, the last-mentioned annular surface having the same cone angle as that on the piston.

References Cited

UNITED STATES PATENTS

| 1,639,747 | 8/1927 | Nelson | 91—396 |
| 3,054,385 | 9/1962 | Hanna | 91—396 |
| 1,005,190 | 10/1911 | Furlow | 91—392 |
| 2,058,858 | 10/1936 | Fetyko | 91—394 |
| 2,222,819 | 11/1940 | Light | 91—392 |
| 2,780,204 | 2/1957 | Barley | 91—394 |
| 3,025,836 | 3/1962 | Cook et al. | 91—394 |
| 3,040,712 | 6/1962 | Harrah | 91—394 |
| 3,202,059 | 8/1965 | Ottestad et al. | 91—392 |

FOREIGN PATENTS 1,206,365   10/1959   France.

PAUL E. MASLOUSKY, Primary Examiner.

U.S. Cl. X.R.
91—394; 277—236